Nov. 3, 1925.                                      1,560,040
F. D. CERF
AUTOMOBILE BUMPER
Filed Feb. 9, 1925           2 Sheets-Sheet 1
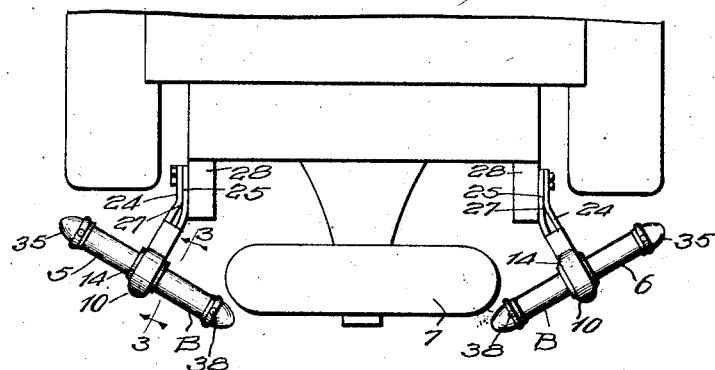
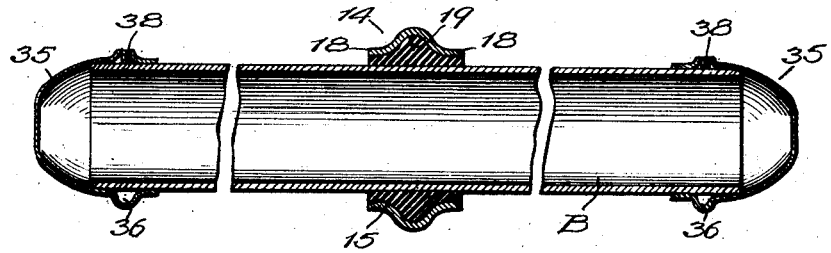
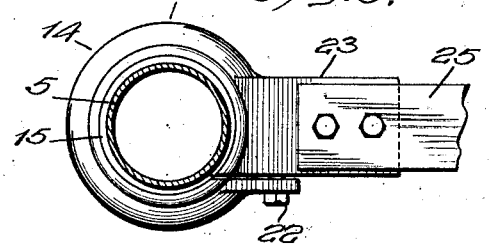
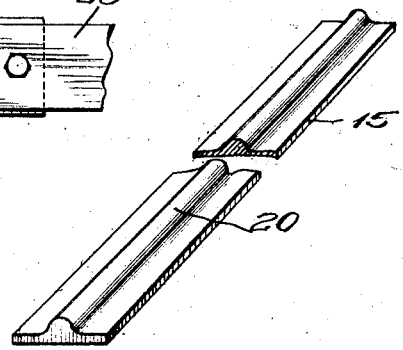
Witnesses:
W. P. Kilroy
Harry R. Levitte
Inventor
Floyd D. Cerf
By Brown, Boettcher & Dienner
Attys

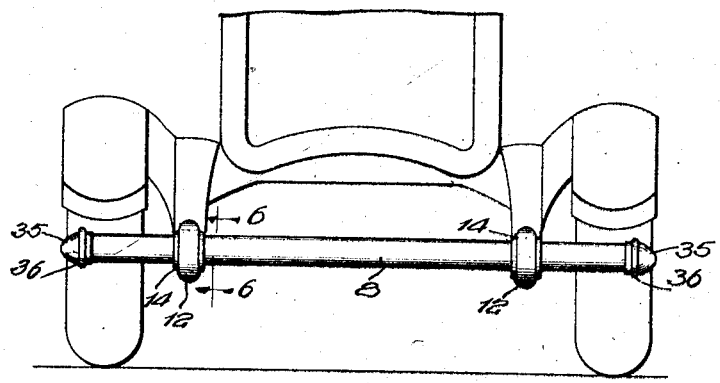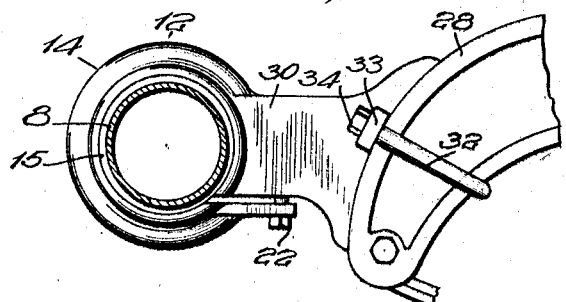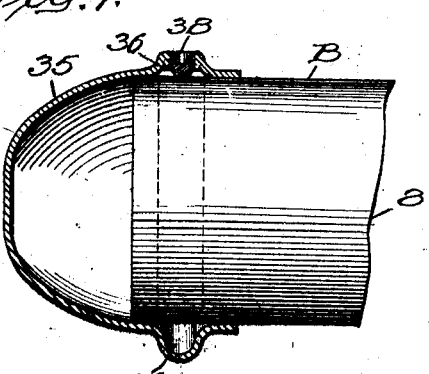

Patented Nov. 3, 1925.

1,560,040

UNITED STATES PATENT OFFICE.

FLOYD D. CERF, OF CHICAGO, ILLINOIS, ASSIGNOR TO AUTOMOBILE EQUIPMENT MANUFACTURING CORPORATION, OF CHICAGO, ILLINOIS, A CORPORATION OF ILLINOIS.

AUTOMOBILE BUMPER.

Application filed February 9, 1925. Serial No. 7,734.

*To all whom it may concern:*

Be it known that I, FLOYD D. CERF, a citizen of the United States, residing at Chicago, in the county of Cook and State of Illinois, have invented a certain new and useful Improvement in Automobile Bumpers, of which the following is a full, clear, concise, and exact description, reference being had to the accompanying drawings, forming a part of this specification.

My invention relates to automobile bumpers and has to do with improving the structure and functioning of devices of this sort, and more particularly with cushioning means therefor.

My invention is illustrated in the accompanying drawings, in which:

Figure 1 is a fragmentary top plan view of an automobile, showing bumper means embodying my present invention therewith;

Fig. 2 is a longitudinal section through a bumper embodying my present invention;

Fig. 3 is a cross section on line 3—3 of Fig. 1;

Fig. 4 is an isometric view of the cushion pad;

Fig. 5 is a front elevational view of a portion of an automobile, showing another embodiment of the invention;

Fig. 6 is a cross sectional view on the line 6—6 of Fig. 5; and

Fig. 7 is an enlarged central longitudinal sectional view through the end of the bumper and the cap thereon.

The bumper means of Figs. 1 and 3 comprises a pair of supplemental bumpers, in the form of relatively short members of uniform cross section, preferably in the form of cylindrical bars or tubes 5 and 6, mounted diagonally or obliquely at opposite sides of the rear end of the vehicle and adapted to supplement the spare tire 7 in affording complete protection for the rear end of the vehicle.

The main bumping member 8 of the device of Figs. 5 and 6 is also of relatively uniform cross section, preferably in the form of a cylindrical bar or tube. It is elongated to extend across the automobile and is mounted across the front of the automobile, its overall length being approximately equal to the overall width dimension of the front of the automobile.

The main bumping member and end cap of the front and rear devices are, except for the differences in length and manner of attachment of the mounting member to the automobile frame, substantially the same so that a detailed description of one will suffice for all.

As already pointed out, the main bumping member of each device, designated at B in Figs. 2 and 7, is of relatively uniform cross section preferably in the form of a cylindrical bar or tube, of metal or other suitable material. A single mounting member 10 is provided for each of the rear bumpers 5 and 6 and a pair of mounting members 12, 12 are provided for the front bumper 8. Each of the mounting members 10 and 12, 12 has a single split ring 14 of liberal cross section which is adapted to encircle the main bumping member, as shown. The internal diameter of the ring 14 is, in each instance, greater than the external diameter of the bumping member which it encircles. This provides an annular or circumferential space and a cushioning element 15 of resilient material embraces the bumping member in this space and is confined between the bumping member and the interior of the split ring.

The cushioning element 15 is in each case preferably in the form of a relatively flat strip of resilient rubber of a width approximately that of the width of the split clamp and of suitable thickness to give the desired resilience between the bumping member and associated mounting member or members. In assembly the cushioning element or rubber ring 15 may be wrapped internally within the split clamp 14 of the mounting member to embrace the bumping member and lie circumferentially between it and the split clamp of the mounting member. For preventing accidental displacement of the cushioning element, I interlock it and the split ring of the clamping member together. This may be done by contracting the opposite ends of the split ring 14 of the clamp at 18, 18 to form an internal circumferential groove 19 embracing the bumping member and forming a longitudinal bead or ridge 20 on the surface of the strip from which the ring 15 is formed, the bead or ridge 20 engaging in the groove 19 and interlocking the mounting member and cushioning or resilient ring against relative displacement. The formation of the cushioning element or resilient ring in the form of a flat strip facilitates laying it between the bumping member B and the split ring of the mounting member with its bead or ridge 20 in interlocking engagement with the groove 19. Continuous resilient rings with other provisions for interposing them in place are, however, contemplated.

The split ring 14 is tightly clamped about the cushioning element or yieldable ring 15 and thereby upon the bumping member through the element or ring 15 by a cap bolt 22 engaging in extensions on the end of the split ring, as shown in Figs. 3 and 6. One end of the split ring of the rear mounting member has a further extension 23 to the opposite side, respectively, of which arms 24 and 25 are secured, as by bolts 26. The extension 23 may be morticed for the reception of these arms, as shown, and the free ends of the arms 24 and 25 may be brought together and turned obliquely at 27, to lie one on the other parallel to the rear end of the main frame member 28 of the automobile, one bracket or mounting member being attached to the rear end of each of the two frame members by bolting or otherwise attaching the arms 24 and 25 to the frame members.

One end of each of the split clamps of the front mounting members has a further extension 30 (Fig. 6), which forms a mounting pedestal and which may have its base formed to conform with the upper surface of the forward curved end of the frame member 28. The mounting pedestals 30 are suitably attached to the forward ends of the frame members 28, as by means of U bolts 32 embracing the adjacent end of the frame member and having their free ends extending through lugs 33 on the pedestal and engaging in suitable nuts 34, or any other suitable or preferred attachment may be employed.

In Figs. 2 and 7 I have shown the manner in which the end caps 35, 35 are made and secured to the ends of the main bumping members. These end caps may be cast or of sheet metal suitably formed, and they have cylindrical portions for receiving the ends of the main bumping member B. The end of the bumping member enters the cylindrical portion of the cap and the cap has a raised bead 36 which surrounds the inserted end of the bumping member. A set screw 38, threaded through the circumferential bead 36, is adapted to be screwed up into engagement with the wall of the bumping member to fasten the cap securely thereon. The bead 36 gives the cap a finished appearance and spaces the wall of the cap in which the set screw 38 is threaded radially from the wall of the bumping member to allow sufficient adjustment for proper loosening and tightening of the screw and to provide sufficient retention when the set screw is loosened, so that it may be held against displacement from the cap.

The wrapping of the cushion pad about the bumping member provides a cushion for taking up the shocks and permitting relative movement between the bumper and mounting member upon striking an object. The annular circumferential disposition of the pad and its interposition between the bumper and embracing clamp permits the pad to take up these shocks and to permit relative movement in any direction and the mounting ring being clamped upon the bumper through the cushion pad or resilient ring, a tight and secure connection between them is assured.

I claim:

1. An automobile bumper comprising a bumping member, a cushioning element of yieldable material embracing said bumping member, a mounting member having means embracing said cushioning element and clamped thereon and means for attaching said mounting member to the chassis of an automobile.

2. An automobile bumper comprising a bumping member, a mounting member having a split ring encircling said bumping member, the internal diameter of said ring being greater than the external diameter of the bumping member, a ring of resilient rubber embracing the bumping member and confined between it and the split ring of the mounting member, and means for attaching said mounting member to an automobile frame.

3. An automobile bumper comprising a main bumping member, a mounting clamp embracing same, a cushioning element embracing the bumping member and interposed between it and the mounting clamp, and means interlocking the cushioning element and mounting clamp together.

4. An automobile bumper comprising a bumping member, a cushioning element of yieldable material embracing said bumping member, a mounting member having means embracing said cushioning element and clamped thereon, means interlocking the mounting member and cushioning element against relative displacement in the direction of the length of the bumping member, and means for attaching said mounting member to an automobile frame.

5. An automobile bumper comprising a cylindrical bumping member of tubular formation, a mounting member having a single split ring encircling said bumping member, the internal diameter of said ring being greater than the external diameter of the bumping member, a ring of resilient rubber embracing the bumping member and confined between it and the split ring of the mounting member, said single split ring having an internal circumferential groove and said resilient ring having a circumferential bead interlocking with said groove and means for attaching said mounting member to an automobile frame.

6. In an automobile bumper, a tubular bumping member, an end cap therefor, the end of the bumping member entering said cap and the cap having a raised bead surrounding the end of the bumping member, and means passing through said bead for securing said cap and member together.

7. In an automobile bumper, a tubular bumping member, a cap telescoping over each end thereof, and means passing through the wall of said cap and engaging the end of said bumping member for securing said cap and member together.

In witness whereof, I hereunto subscribe my name this 5th day of February, 1925.

FLOYD D. CERF.